Figure 1:
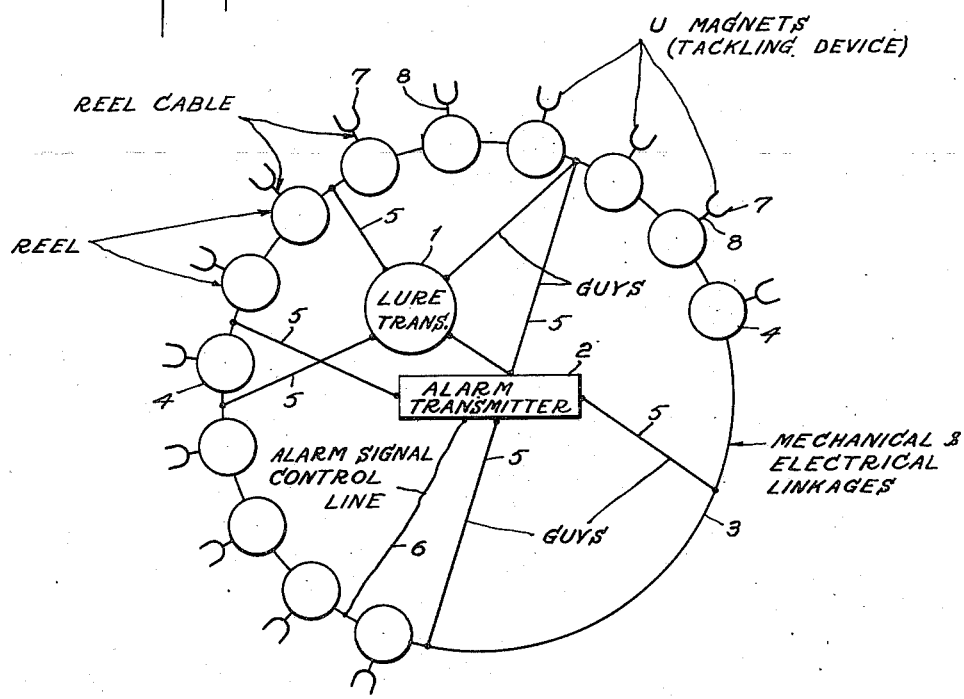

Aug. 20, 1946.  B. SHEFFIELD  2,406,111
RADIO SUBMARINE LURE AND TRAP
Filed Dec. 10, 1943  2 Sheets-Sheet 1

INVENTOR.
Berthold Sheffield
BY
ATTORNEY.

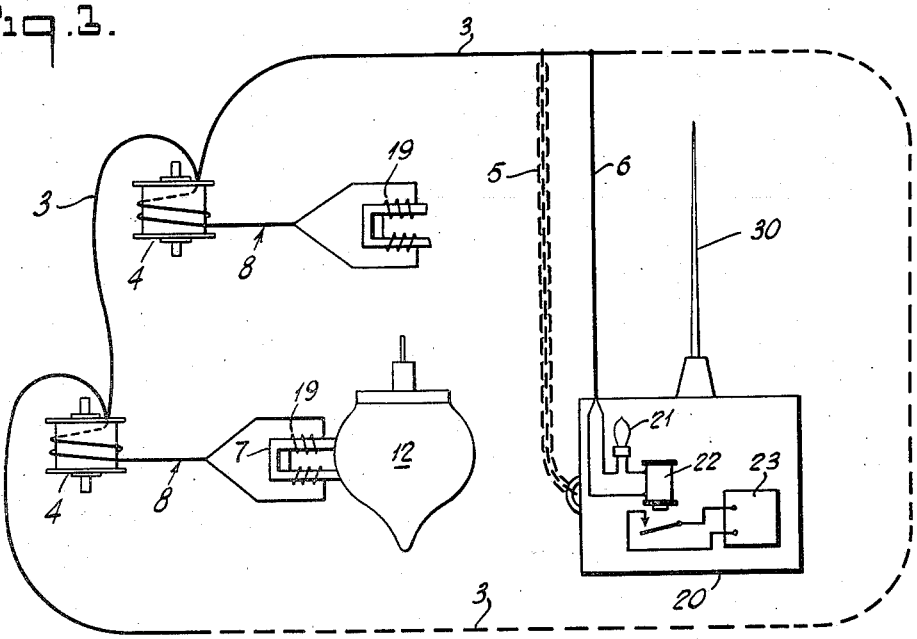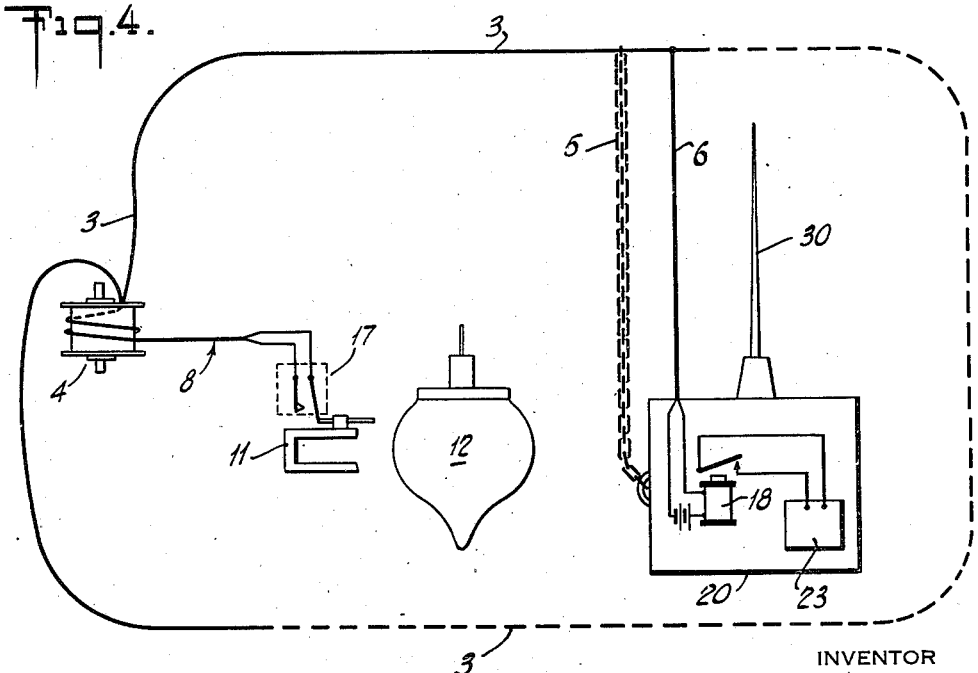

UNITED STATES PATENT OFFICE 2,406,111

RADIO SUBMARINE LURE AND TRAP

Berthold Sheffield, Rocky Point, N. Y., assignor to Radio Corporation of America, a corporation of Delaware Application December 10, 1943, Serial No. 513,665

9 Claims. (Cl. 35—25)

This invention relates to a submarine radio lure and alarm system.

An object of this invention is to provide a radio lure for a submarine.

Another object of this invention is to provide an alarm or trap for submarines.

A feature of this invention is a simple oscillator which provides the lure transmitting a weak radio signal around 600 meters and a trap or alarm system which is located near the lure device which has means to simulate radio frequency oscillation signals at a different frequency from that of the lure device.

The submarine radio lure and trap of this invention is intended to lure a submarine into the region of an invisible radio trap. The trap, on contacting the vessel, attaches itself and discloses its position and movement by supplying a continuous radio alarm signal which gives compass bearings to distant observers.

The device of this invention is divided into two parts, one part being the lure device or lure transmitter, and the other part being the trap, which consists of a number of floating tackles and a single associated alarm transmitter. Each tackle in turn has two separately floating units including a spring retracting reel and the tackling device which consists of U-shaped magnet and either an associated inductance or an associated microswitch. The reels float submerged and their spring retracting cable holds the tackling device in close proximity. A number of reel and tackle units are arranged to float in a large circle. They are linked mechanically and electrically to the common alarm transmitter which floats slightly submerged.

The lure device is in the form of a very simple radio frequency oscillator having an operating frequency range of about 600 meters to simulate the oscillations which might be carelessly radiated by a shipboard radio receiver, thus apparently divulging to the submarine the position of a passing convoy. It consists of a water-tight box holding a low power lure transmitter which floats slightly submerged and has located thereon a very thin vertical antenna which projects above the surface of the water. As a modification the above mentioned lure transmitter may be remotely controlled to simulate movement in position of a vessel and also that of a varying radio frequency. The trap and alarm device consists of a plurality of U magnets and associated inductance (or microswitch) comprising the tackling device, also cable reels, mechanical and electrical linkages for conducting alarm pulses to the common alarm device or alarm radio transmitter which has, located in its water tight compartment, mechanisms for emitting short wave radio frequency signals.

Figure 2:
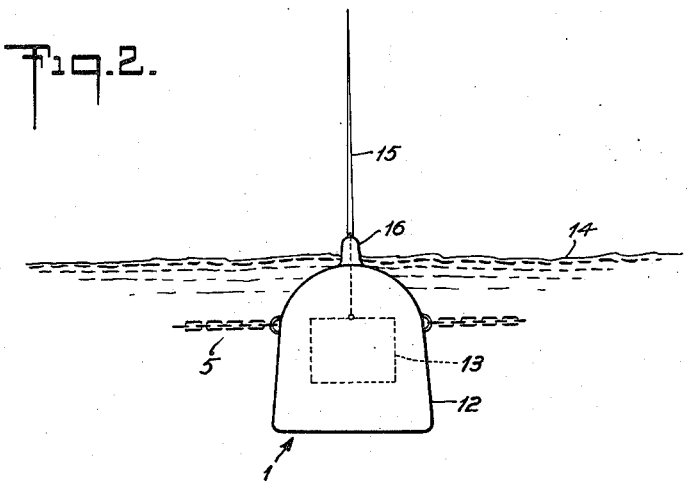

This invention will best be understood by referring to the accompanying drawings in which:

Fig. 1 shows a top view of the general arrangement of the system of this invention, Fig. 2 shows an arrangement of the radio lure, Fig. 3 shows the radio alarm device and transmitter, and Fig. 4 shows an alternative alarm device and transmitter.

The arrangement of the system of this invention as shown by Fig. 1 includes a lure radio transmitting device 1, and an alarm transmitter 2, both of which are fastened together within a circle of mechanical linkages or guys 5 and electrical linkages 3 and also a plurality of reels 4. An alarm signal control line 6 connects the transmitter with the electrical linkages 3. Each reel has a U-shaped permanent magnet 7 secured to the end of a cable 8. The magnet 7 will attach itself to any magnetic material such as a submarine or a ship's hull and while attached thereto, sets off the radio alarm and other apparatus.

Referring now to Fig. 2, the lure device 1 comprises a water-tight container 12 which holds a low power radio transmitter 13. The transmitter 13 is tuned to operate around a frequency of 600 meters. The container 12 is arranged to float slightly submerged below the surface of the water 14. A thin vertical antenna 15 is supported from container 12 by means of an insulator 16.

The trap or alarm actuating devices shown by Fig. 3 consist of permanent magnets 7 constructed to be very light in weight and of high magnetic strength so as to be readily attracted by a steel hull 12 of a submarine. When the magnets 7 attach themselves firmly to the submarine, closure of the magnetic circuit by the submarine's steel hull 12 induces a voltage in an inductance 19 mounted on the magnets 7. The induced voltage in turn triggers a radio system 20, which comprises a cold cathode tube 21, a sensitive relay 22 and a simple high frequency transmitter 23 operating at a frequency range of about 5 to 10 meters.

An alternative form for starting the radio alarm transmitter is shown by Fig. 4, which may be by mechanical means, such that contact of the magnets 11 with a ship's hull 12 operates a microswitch 17 mounted on the pole pieces of the magnets 11, causing a relay 18 to close, which in turn starts the radio transmitter 23.

In the operation of this system the magnetic trap and alarm devices are mechanically linked so that a moving submarine will pull the entire light weight system, shown by Fig. 1, along its path. It is desirable to have the lure send out weak oscillations of about 600 meters continuously. The alarm transmitter sends out short wave oscillations when one of the magnets is attached to the hull of the submarine by actuation of the relay. The alarm transmitter also serves as a radio compass station and discloses the position of the submarine to radio observers within a radius of about 50 miles. By means of reels 4 and cables 8 the trap magnets may follow the submarine to any depth without submerging the alarm devices below the normal level of the water surface 14.

The alarm transmitter antenna 30 is a small thin vertical rod which is invisible for all practical purposes because of its small dimensions it is efficient for radiation at the operating frequency of 5 to 10 meters. Detection of its location by the uninitiated radio monitoring listener is unlikely as the alarm transmitter is intended to operate on frequencies outside the regular radio compass range.

The lure transmitters will also serve to warn friendly vessels from the vicinity of "mined" areas. In this system only one lure is required for a large number of traps.

While I have indicated and described a system of my invention, it will be apparent to one skilled in the art that my invention is by no means limited to the particular devices shown and described, but that many modifications may be made without departing from the scope of my invention.

What I claim is:

1. A submarine lure and alarm system comprising a lure device having means to radiate radio frequency oscillations to attract a submarine to its location, an alarm device located near and coupled to said lure, said alarm device having magnetic means to attach itself to the attracted submarine and means to then radiate radio frequency oscillations which are operated at a different frequency value from the frequency radiated by said lure.

2. A submarine lure and alarm system comprising a lure device having means to float slightly submerged below the surface of a large body of water and to radiate radio frequency oscillations to attract a submarine to its location, a plurality of alarm devices located in a circle near and coupled to said lure, said alarm devices having magnetic means to attach themselves to the attracted submarine and means to then radiate radio frequency oscillations which are operated at a different frequency value from the frequency radiated by said lure.

3. A submarine lure and alarm system comprising a lure device having means including a vertical rod antenna to radiate radio frequency oscillations to attract a submarine to its location, a plurality of alarm devices located near and coupled to said lure, said alarm devices having magnetic means to attach themselves to the attracted submarine and means to then radiate radio frequency oscillations which are operated at a different frequency value from the frequency radiated by said lure.

4. A submarine lure and alarm system comprising a lure device having remote control means to radiate radio frequency oscillations to attract a submarine to its location, a radio alarm device located near and coupled to said lure, said alarm device having means including a magnet and associated mechanism to radiate radio frequency oscillations which are of a different frequency value from the frequency radiated by said lure, said magnet being arranged to attach itself to a magnetic object on the attracted submarine and to set off and continue to sound the radio frequency oscillations from said radio alarm device when said magnet attaches itself and remains attached to said magnetic object.

5. A submarine lure and alarm system comprising a lure device having means to radiate radio frequency oscillations to attract a submarine to its location, a radio alarm device located near and coupled to said lure, said radio alarm device having means including a U-shaped magnet and associated mechanism to radiate radio frequency oscillations which are of a different frequency value from the frequency radiated by said lure, said U-shaped magnet being arranged to attach itself to a magnetic object on the attracted submarine and to set off and continue to sound the radio frequency oscillations from said radio alarm device when said magnet attaches itself and remains attached to said magnetic object.

6. A submarine lure and alarm system comprising a water-tight container having located thereon a lure device having means to radiate radio frequency oscillations to attract a submarine to its location, a plurality of alarm devices located near and coupled to said lure, said radio alarm device having magnetic means to attach themselves to the attracted submarine and means to then radiate radio frequency oscillations which are of a different frequency value from the frequency radiated by said lure.

7. A submarine lure and alarm system comprising a lure device having means including a radio transmitter to radiate radio frequency oscillations, a radio alarm device located near and coupled to said lure, said alarm device having means including a magnet and associated mechanism to radiate radio frequency oscillations which are of a different frequency value from the frequency radiated by said lure, said magnet arranged to be attached to the magnetic metal of a ship's hull, and a relay device associated with said magnet to actuate said radio transmitter when said magnet is attached to the hull of a ship.

8. A submarine lure and alarm system comprising a water-tight container having located thereon a lure device having means to radiate radio frequency oscillations to attract a submarine to its location, a plurality of alarm devices located near and coupled to said lure, said alarm devices having magnetic means to attach themselves to the attracted submarine and means to then radiate radio frequency oscillations which are of a different frequency value from the frequency radiated by said lure, and a vertical radiator located on said water-tight container to radiate radio frequency oscillations.

9. A submarine lure and alarm system comprising a water-tight container having located thereon a lure device having means to radiate radio frequency oscillations to attract a submarine to its location, a plurality of alarm devices located near and coupled to said lure by mechanical and electrical linkages, a reel and a cable securing all of said alarm device together, said alarm devices having magnetic means to attach themselves to the attracted submarine and means to then radiate radio frequency oscillations which are of a different frequency value from the frequency radiated by said lure, and a vertical radiator located on said water-tight container to radiate radio frequency oscillations.

BERTHOLD SHEFFIELD.